Aug. 13, 1946.  O. J. POUPITCH  2,405,925
FASTENING DEVICE
Filed Feb. 23, 1944    2 Sheets—Sheet 2
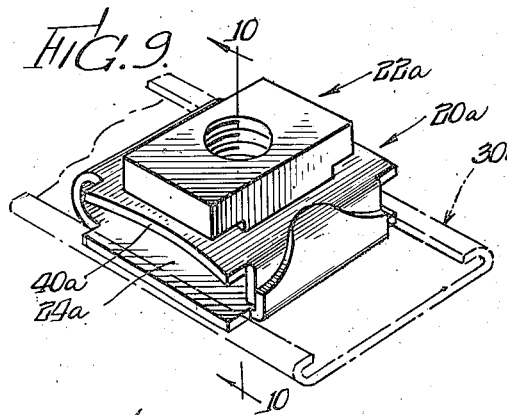
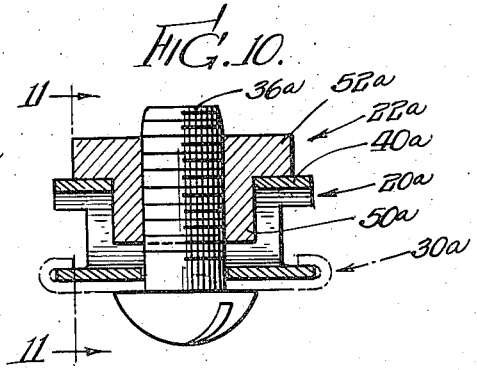
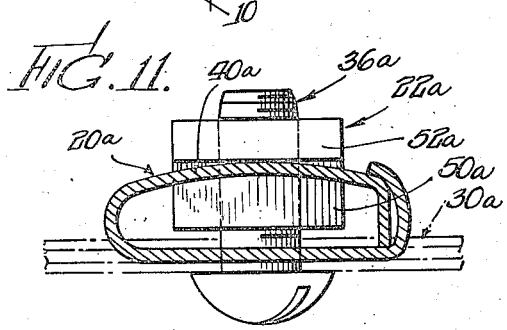
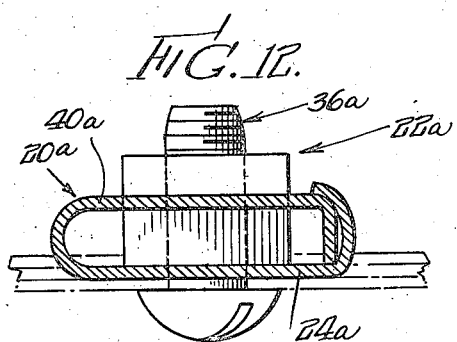
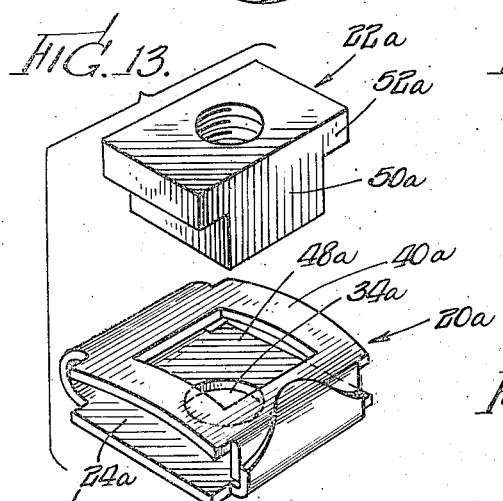
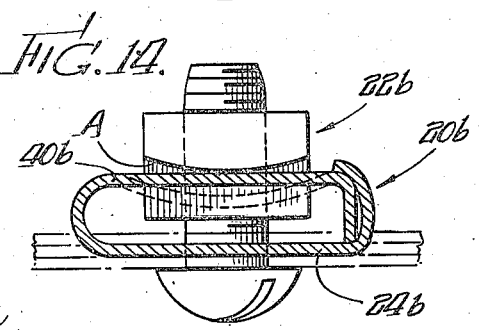
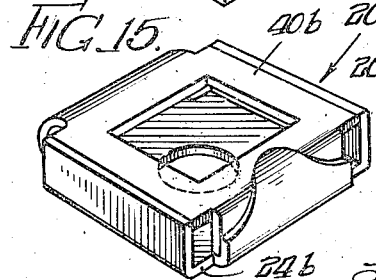
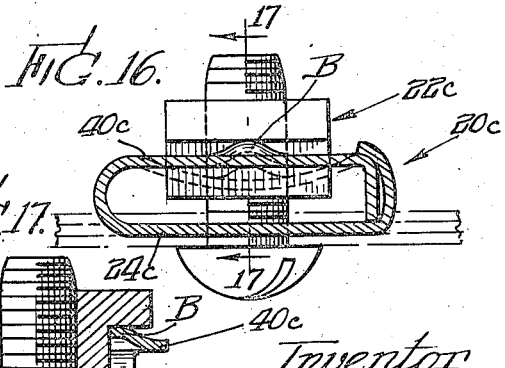
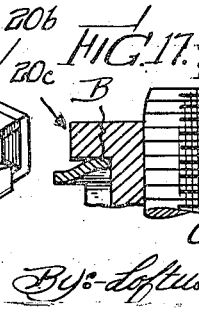
Inventor
Ougljesa Jules Poupitch
By:- Loftus, Moore, Olson & Trexler attys Patented Aug. 13, 1946

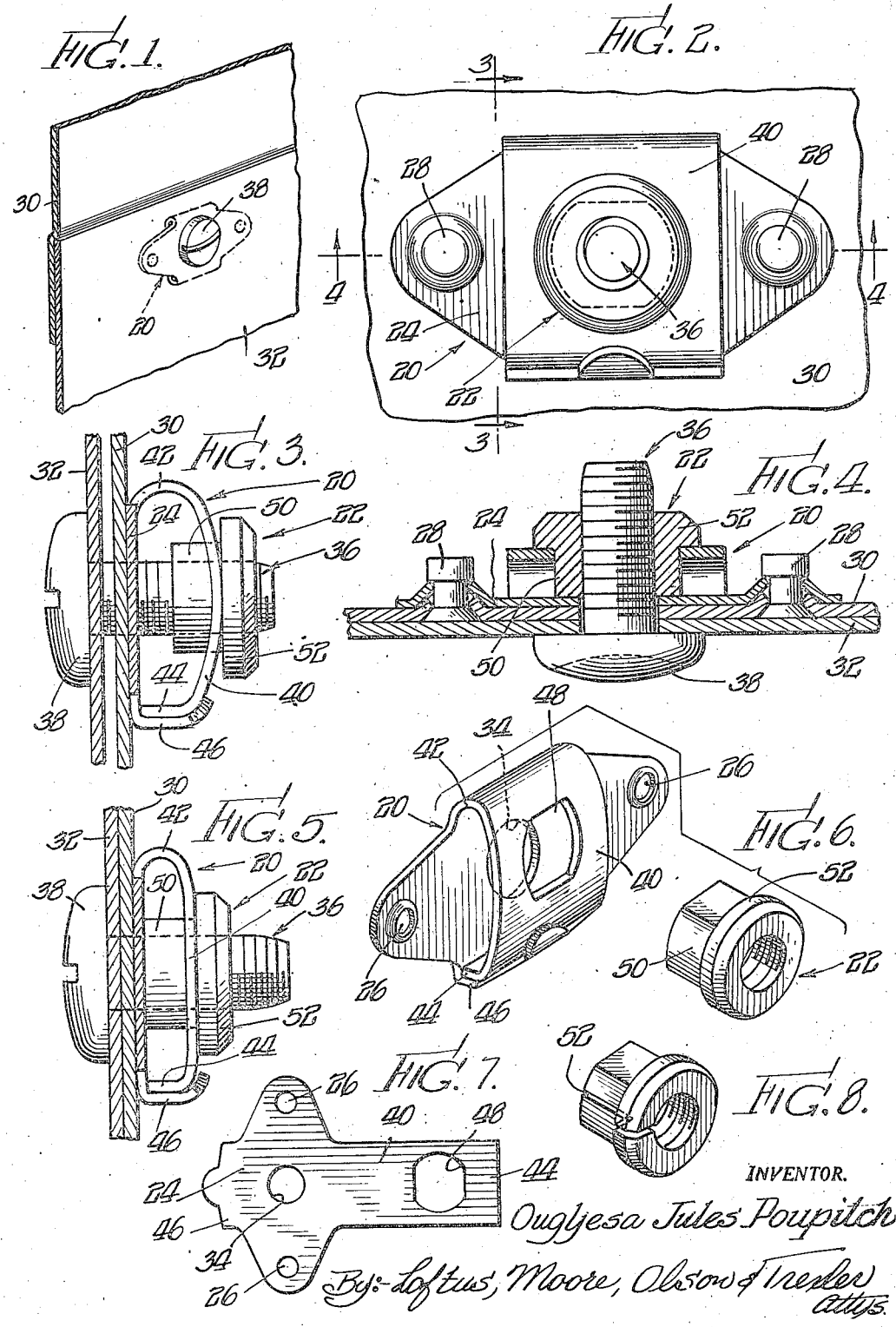

2,405,925

UNITED STATES PATENT OFFICE 2,405,925

FASTENING DEVICE

Ougljesa Jules Poupitch, Chicago, Ill., assignor to Illinois Tool Works, Chicago, Ill., a corporation of Illinois Application February 23, 1944, Serial No. 523,501

7 Claims. (Cl. 151—38)

This invention relates generally to fastening devices and, more particularly, to fastening devices wherein a portion thereof is formed of sheet metal stock which is designed to accommodate an internally threaded member or nut.

It is an important object of the present invention to provide a fastener which may be employed to effectively secure a screw member against loosening, and to this end the invention contemplates a sheet metal section providing a resilient bridge section for supporting a nut member, the resiliency of the bridge serving to establish sufficient frictional resistance between the nut and a companion screw member so as to secure the parts against inadvertent retrograde rotation.

More specifically, the invention contemplates a fastening device as set forth above wherein a nut member carried by a bridge section provides an effective abutment to insure complete tightening of a complementary screw element without completely flattening the bridge section.

It is a further object of the present invention to provide a fastener of extremely simple and practical construction wherein a nut member is detachably associated with a resilient bridge section as referred to above and, accordingly, it is proposed to interlock the nut member and bridge section against relative rotation.

The invention also contemplates a fastening arrangement wherein the constituent parts thereof may be very economically produced and subsequently assembled in a very simple and expeditious manner.

The foregoing and other objects and advantages will be more apparent from the following detailed description when considered in connection with the accompanying drawings wherein:

Figure 1 is a perspective view of a pair of plates secured together by a fastener device embodying features of the present invention.

Figure 2 is an enlarged elevational view of the fastener device shown in Figure 1 and as viewed from the rear of Figure 1.

Figure 3 is a transverse sectional view taken substantially along the line 3—3 of Figure 2, the associated members being shown prior to the final tightening of the screw within the nut supported by the resilient bridge.

Figure 4 is a transverse sectional view taken along the line 4—4 of Figure 2 disclosing the screw and its complementary nut tightened in position so as to firmly secure the two work sheets together.

Figure 5 is a view similar to Figure 3 disclosing the assembled parts firmly clamped together.

Figure 6 is a perspective view of the nut and sheet metal retainer means therefor disclosed in disassembled relation.

Figure 7 is a plan view of a sheet metal blank from which the nut retaining structure of the preceding figures may be produced.

Figure 8 is a perspective view of a slightly modified form of nut provided with a longitudinal slot which enables the nut to be slightly contracted and thereby increase the locking effectiveness of the nut with respect to its complementary screw member.

Figure 9 is a perspective view of a modified fastener construction contemplated by the present invention in the form of a two-part nut device.

Figure 10 is a vertical sectional view taken substantially along the line 10—10 of Figure 9 with a nut element shown in operative association therewith prior to final clamping.

Figure 11 is a transverse sectional view taken substantially along the line 11—11 of Figure 10.

Figure 12 is a view similar to Figure 11 after the parts have been firmly clamped to the workpiece illustrated by dot and dash lines.

Figure 13 is a perspective view of the retainer and nut member in disassociated relation.

Figure 14 is a view similar to Figure 10 disclosing a nut element which is provided with a flange, the underside of which is curved to facilitate flexing of the sheet metal bridge section— the flexed tightened position of said bridge member being illustrated by dotted lines.

Figure 15 is a perspective view of the nut retaining structure shown in Figure 14.

Figure 16 is a sectional view similar to Figure 14 illustrating the manner in which the upper portion of the nut retaining structure may be provided with a cam-like boss portion to facilitate flexing of the sheet metal bridge member when the parts are tightened in position, the final tightened position occupied by the resilient bridge member being illustrated in dotted lines, and Figure 17 is a fragmentary transverse sectional view taken along the lines 17—17 of Figure 16.

Referring now to the drawings wherein like numerals have been employed to designate similar parts throughout the various figures, it will be seen that one embodiment of the invention is disclosed in Figures 1 to 7, inclusive. The fastener shown in these figures comprises a sheet metal nut retainer member or means designated generally by the numeral 20 and a complementary nut member 22 supported by the retainer. The retainer member 20 includes a base portion 24 provided with apertures 26 at opposite extremities (Figure 6) to accommodate rivets 28. These rivets 28 serve to secure the nut retainer upon one of a pair of sheet metal work pieces 30 and 32 as clearly illustrated in the drawings. The central portion of the base is provided with an aperture 34 to accommodate a threaded screw member 36, the head 38 of which is adapted to be clamped against the outer surface of the work piece 32 when finally tightened in position as clearly illustrated in Figure 4. Formed integral with the base 24 and disposed in superimposing relation with respect to said base, is a spring member or portion 40. This spring 40 is maintained in spaced relation with respect to the plane of the base 24 by an integral spacing section 42 on one side and overlapping spacing sections 44 and 46 on the other side, the section 46 being formed integrally with and bent outwardly from the base 24 and the section 44 being formed integrally with the spring 40 at the free extremity thereof. The spaced section 46 is preferably bent over the spring 40 sufficiently to prevent outward dislodgement or displacement of the free extremity of the spring 40.

It will be noted that the central portion of the spring 40 is provided with a non-circular aperture 48 to accommodate a reduced section 50 of the nut 22. The aperture 48 is disposed in axial alignment with the aperture 34 so that when the screw 36 is passed through the aperture 34 it may conveniently be brought into threaded engagement with the internal threads of the nut 22. The nut 22 is provided with a flange or head 52 which bears against the outer surface of the spring 40. It also will be apparent from the foregoing description that the work pieces 30 and 32 must be apertured similarly to the central portion of the base plate 24 to accommodate the fastening screw 36.

The nut 22 and retainer 20 when initially assembled with each other have a sufficiently close frictional fit to prevent inadvertent or unauthorized separation. In other words, the frictional fit between these parts is such that the combined elements may be handled as a unit. In Figure 3 the fastener and screw are shown in the positions occupied before the sheets 30 and 32 have been clamped together. Continued rotation of the screw 36 in a tightening direction after the sheets 30 and 32 have been brought together causes the lateral stressing of the spring 40 toward the plate 24. This ultimately results in causing the advancing surface of the nut to abut the outer surface of the base plate 24 in the vicinity of the aperture 34 as clearly illustrated in Figures 4 and 5. In this position, the spring 40 has been laterally stressed sufficiently to exert a strong spring action against the nut tending to bind the thread convolutions of the nut against the complementary thread convolutions of the screw. The abutment of the nut surface against the base plate prevents the stressing of the spring 40 beyond its elastic limitations and thus insures a very firm binding action between the screw and nut.

It will be noted that by employing the arrangement of the base plate and superimposing spring, none of the stresses experienced by the spring are transmitted to the rivets 28. That is to say, the rivets experience no shearing stresses as a result of the lateral stressing of the spring 40.

The aperture 48 is of such size as to permit the free insertion of the reduced portion 50 of the nut 20 when the spring 40 occupies its flattened state, and when said spring is sprung to its normal curved position as illustrated in Figure 5, the edges of the stock defining the aperture 48 frictionally bear against the complementary side surfaces of the nut section 50 and thus secure the parts against inadvertent separation.

In Figure 8 a slightly modified nut is shown. The nut of Figure 8 is similar in structural details to the nut 22, except that a longitudinal slot 52 is provided. With this construction the nut partakes of the nature of a collet and when it is tightened in the position shown in Figures 4 and 5, the tendency for the nut to be sprung to a smaller diameter due to the crowded action of the spring 40 introduces additional frictional gripping upon the rotation of the screw 36. Thus, in addition to the resilient friction developing action of the spring 40 the nut body itself is resiliently urged into gripping relation with the thread convolutions of the screw 36.

In Figures 9 to 13, inclusive, a slightly modified fastener device is shown which includes a sheet metal retainer member or means 20a which accommodates a nut 22a. The retainer 20a includes a base portion 24a which is provided with a central aperture 34a to accommodate a screw 36a. Formed integral with and superimposing the base plate 24a is a spring member 40a which functions in the same manner as the spring 40 previously described. The nut 22a has a reduced portion 50a and a polygonal cross section adapted to be received by a complementary aperture 48a. A flange 52a is designed to bear against the outer surface of the spring 40a. The fastening device of Figures 9 to 13, inclusive, is not equipped with extensions or tabs for accommodating rivets but is more in the nature of a nut structure. For purposes of illustration a channel member 30a, illustrated by dot and dash lines, constitutes the work piece for accommodating the retainer 20a. In Figures 9 to 11, inclusive, the retainer and nut are shown in the position occupied before tightening. In Figure 12 the parts are shown in their tightened position with the bottom surface of the nut firmly clamped against the base plate 24a. The spring 40a functions similarly to the spring 40, previously described, in axially urging the nut 22a into firm frictional engagement with the convolutions of the threads on the screw member 36a. The nut 22a like the nut 22 is resiliently supported by a spring capable of withstanding high tensile loads. The nut 22a is adapted to seat itself solidly against the base plate 24a, thereby taking up the entire tightening load. It is preferred to preliminarily assemble the nut 22a with the aperture 48a while the spring 40a is in a flattened state, the subsequent bowing of the spring serving to grip the side surfaces of the nut and thus secure the nut against separation from the spring.

In Figures 14 and 15 a slightly modified arrangement is disclosed. A nut 22b is formed with an arcuate clamping surface A designed to engage a spring member 40b with a retainer member 20b. This spring member 40b superimposes a base plate 24b and functions similarly to the spring plates 40 and 40a, previously described. The spring 40b is normally flat as illustrated in Figures 14 and 15, and by having the clamping surface of the nut 22b arcuate, said spring may be readily deflected from its flattened state to the curved dotted line position illustrated in Figure 14. This differs from the previously described springs 40 and 40a which are normally bowed outwardly. In all other respects, however, the device shown in Figures 14 and 15 functions similarly to the device previously described.

In Figures 16 and 17 a nut 22c is shown which is structurally similar to the nut 22a previously described. This nut 22c cooperates with and is held within a retainer member 20c, said retainer member including a resilient plate 40c and a base plate 24c. The plate 40c is provided with protuberances B which are adapted to be engaged by a complementary clamping surface of the nut 40c. Thus, when the nut is firmly tightened against the spring 40c, said spring assumes the flexed dotted line position as illustrated in Figure 16.

From the foregoing, it will be apparent that the present invention contemplates a fastening device of improved practical construction wherein the spring superimposing the base provides a very firm resilient support for the nut element coupled therewith. The base plate rests firmly against the work piece and no deleterious strains or stresses are experienced by the base plate as a result of the flexing of the superimposing spring plate. By causing the nut to be ultimately brought into abutment with the surface of the base the degree of flexing of the spring element is limited. The base plate provides a firm abutment surface for the nut and thus enables the complementary screw member to be firmly tightened in place without in any way impairing the locking effectiveness of the resiliently supported nut.

Obviously, the invention is not limited to the specific disclosure but is capable of other modifications and changes without departing from the spirit and scope of the appended claims.

The invention is hereby claimed as follows:

1. A fastening device for accommodating a screw element comprising a base section having a screw receiving aperture, a resilient section spaced from and bridging said base section, spacing members extending transversely between said sections to hold said sections in separated relation, and a nut member supported as a unit by said resilient section in spaced relation to the plane of said base section and non-rotatable with respect to said resilient section, said nut having its internally threaded aperture in alignment with the aperture of the base for receiving a fastening screw element, whereby the tightening of a screw and nut will cause said resilient section to be stressed laterally toward the base section spaced therefrom so as to increase frictional contact between complementary thread convolutions.

2. A fastening device for accommodating a screw element comprising a base section having a screw receiving aperture, a resilient section spaced from and bridging said base section and having a nut receiving aperture, spacing members extending transversely between said sections to hold said sections in separated relation, and a nut member supported as a unit within the aperture of said resilient section and normally spaced from the plane of said base section and non-rotatable with respect to said resilient section, said nut having its internally threaded aperture in alignment with the aperture of the base for receiving a fastening screw element, whereby the tightening of a screw and nut will cause said resilient section to be stressed laterally toward the base section so as to increase frictional contact between complementary thread convolutions.

3. A fastening device for accommodating a screw element comprising a base section having a screw receiving aperture, a resilient section spaced from and bridging said base section, spacing members extending transversely between said sections to hold said sections in separated relation, and a nut member supported as a unit by said resilient section and normally spaced from the plane of said base section and non-rotatable with respect to said resilient section, said nut having its internally threaded aperture in alignment with the aperture of the base for receiving a fastening screw element, whereby the tightening of a screw and nut will cause said resilient section to be stressed laterally toward the base section so as to increase frictional contact between complementary thread convolutions, the structure of said nut extending sufficiently beyond said resilient section toward the base section to provide an abutment for limiting the extent to which said resilient section and consequently the nut may be shifted toward the base section.

4. A fastening device for accommodating a screw element comprising a base section having a screw receiving aperture, a resilient section bridging said base section and having a nut receiving aperture, spacing members extending between said sections to hold said sections in separated relation, and a nut member carried within the aperture of and non-rotatable with respect to said resilient section, said nut having its internally threaded aperture in alignment with the aperture of the base for receiving a fastening screw element, whereby the tightening of a screw and nut will cause said resilient section to be stressed laterally toward the base section so as to increase frictional contact between complementary thread convolutions, said nut having a reduced section adapted to be accommodated by the aperture in said resilient section, and an enlarged portion providing a flange for engaging the outer surface of said resilient section.

5. A fastening device for accommodating a screw element comprising a base section having a screw receiving aperture, a resilient section spaced from and bridging said base section, spacing members transversely extending between said sections to hold said sections in separated relation, and a resilient collet type nut member supported as a unit by said resilient section in normally spaced relation to the plane of said base section and non-rotatable with respect to said resilient section, said nut having its internally threaded aperture in alignment with the aperture of the base for receiving a fastening screw element, whereby the tightening of a screw and nut will cause said resilient section to be stressed laterally toward the base section spaced therefrom so as to urge the screw and nut axially and to collapse the nut into frictional contact with complementary thread convolutions of the screw.

6. A fastening device for accommodating a screw element comprising a base section having a screw receiving aperture, a resilient section bridging said base section, spacing members extending between said sections to hold said sections in separated relation, and a resilient collet type nut member carried by and non-rotatable with respect to said resilient section, said nut having its internally threaded aperture in alignment with the aperture of the base for receiving a fastening screw element, whereby the tightening of a screw and nut will cause said resilient section to be stressed laterally toward the base section so as to axially urge the nut and screw member to collapse the nut into frictional contact with complementary thread convolutions of the screw element, the structure of said nut extending sufficiently beyond said resilient section toward the base section to provide an abutment for limiting the extent to which said resilient section may be deflected.

7. A fastening device for accommodating a screw element comprising a base section having a screw receiving aperture, a resilient section bridging said base section, spacing members extending transversely between said sections to hold said sections in separated relation, and a nut member having a reduced portion extending into and non-rotatable with respect to said resilient section, the inner extremity of said reduced portion being normally spaced from the plane of said base section, said nut having its internally threaded aperture in alignment with the aperture of the base for receiving a fastening screw element, whereby the tightening of a screw and nut will cause said resilient section to be stressed laterally toward the base section so as to increase frictional resistance to turning between complementary thread convolutions.

OUGLJESA JULES POUPITCH.